United States Patent [19]
Fountain

[11] 3,778,672
[45] Dec. 11, 1973

[54] AUDIBLE ALERT SIGNAL FOR AN ELECTRONIC FLASH UNIT

[75] Inventor: Gerald F. Fountain, Santa Monica, Calif.

[73] Assignee: Ponder & Best, Inc., Los Angeles, Calif.

[22] Filed: July 27, 1972

[21] Appl. No.: 275,690

[52] U.S. Cl............ 315/133, 315/135, 315/136, 315/241 P, 331/64
[51] Int. Cl. ............................................ H05b 37/02
[58] Field of Search............... 315/129, 133, 135, 315/136, 241 R, 241 P; 331/64, 65

[56] References Cited
UNITED STATES PATENTS
3,011,094  11/1961  Kapteyn........................ 315/133 X
3,624,628  11/1971  Schmidt........................... 331/65 X

*Primary Examiner*—Herman Karl Saalbach
*Assistant Examiner*—James B. Mullins
*Attorney*—Charles G. Lyon et al.

[57] ABSTRACT

A circuit in an electronic flash unit including an audio oscillator for providing an audible alert signal to indicate the "ready" state of the flash unit.

18 Claims, 1 Drawing Figure

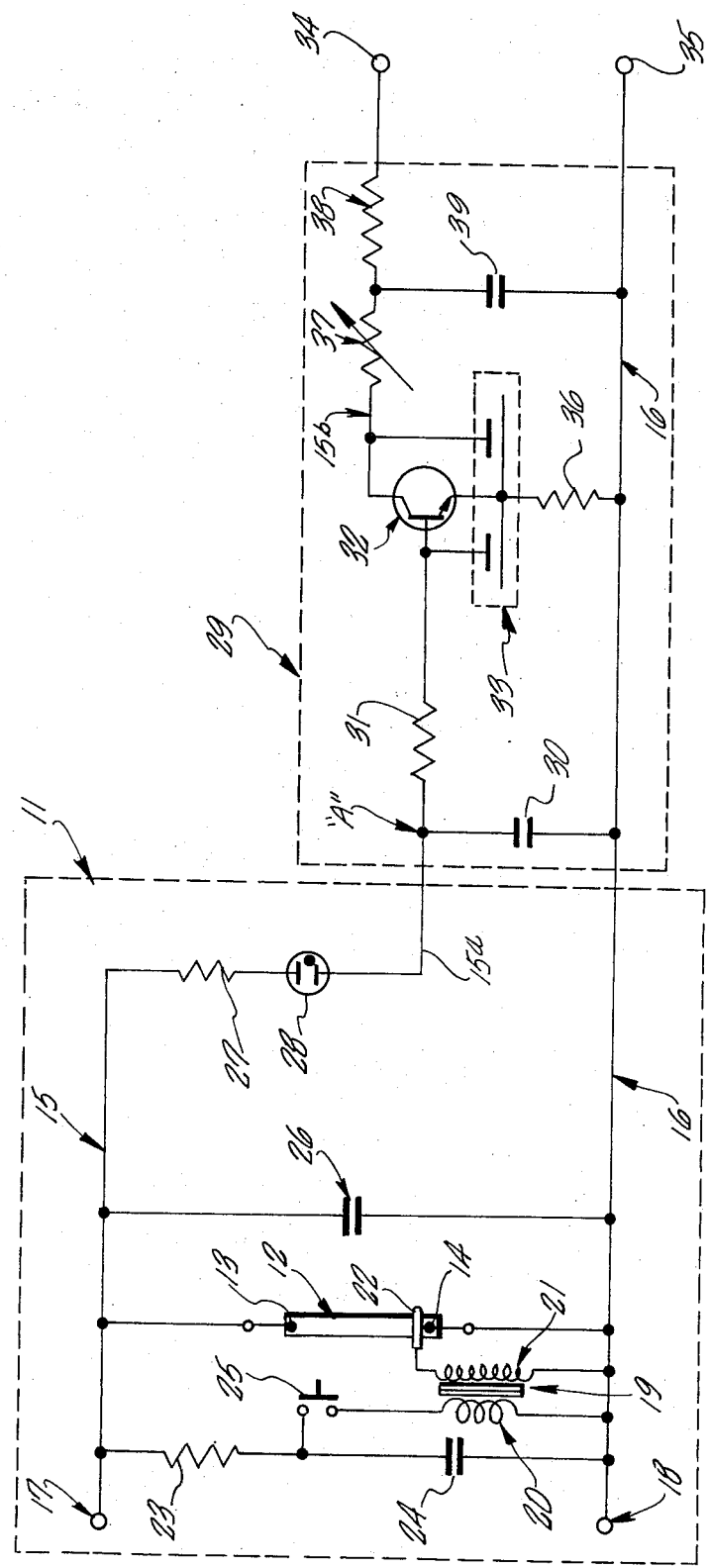

AUDIBLE ALERT SIGNAL FOR AN ELECTRONIC FLASH UNIT

BACKGROUND OF THE INVENTION

This invention relates to an audible alert signal utilized in electronic flash units normally associated with the photographic arts.

Electronic flash units typically include a flash device such as xenon discharge tube, a storage means such as a storage capacitor connected across the discharge tube and triggering circuitry to fire the discharge tube. Once the discharge tube is fired, the storage capacitor is discharged and a recycle time must expire before the storage capacitor is again at a sufficient potential to aid in a subsequent firing of the discharge tube. The user of the electronic flash unit, usually a camera operator, must be alerted that a proper recycle time has expired to allow the flash unit to be in a "ready" state.

In the past, visual alert signals have been utilized to alert the camera operator that the electronic flash unit is capable of producing a flash. Visual alert signals usually employ a neon bulb which is activated when the storage capacitor is at a sufficient potential to aid in the firing of a discharge tube. A visual alert signal is typically difficult to observe in that the camera operator must search for this visual signal by taking his eyes off the camera and camera view finder in order to scan the companion electronic flash unit for a visual indication.

Visual alert signals create a further problem in that the camera operator is likely to be in a variety of lighting conditions and, as such, the condition of the visual signal of bulb may not be readily apparent.

The foregoing problems have been substantially eliminated by providing in a preferred embodiment of my invention a circuit which provides an audible alert signal of a limited duration to alert the camera operator that the associated flash unit is in a "ready" state. This audible alert signal allows the camera operator to give full visual attention to the camera and camera view finder and can enable a lessening of pictures taken when the flash unit is not in the "ready" state.

SUMMARY OF THE INVENTION

It is an object of this invention to provide an audible alert signal for an electronic flash unit.

It is another object of this invention to provide an audible alert signal for an electronic flash unit which will be of a limited duration.

It is a further object of this invention to provide an audible alert signal of limited duration which will be used in combination with a visual alert signal.

Briefly stated, and according to one aspect of my invention, the foregoing objects are achieved by producing an electronic flash unit utilizing an audible alert signal in the form of an audio oscillator or a buzzer to produce an audible alert signal of a limited duration. This audible signal will allow a camera operator to know if his or her associated flash unit is in a "ready" state.

BRIEF DESCRIPTION OF THE DRAWING

The invention both as to its organization and principle of operation, together with further objects and advantages thereof, may better be understood by reference to the following detailed description of an embodiment of the invention when taken in conjunction with the accompanying drawing.

The drawing is a circuit diagram illustrating an exemplary embodiment of the basic concepts of a flash unit comprising an audible alert signal in the form of an audio oscillator in conjunction with a visual alert signal in the form of a neon bulb in accordance with this invention.

DESCRIPTION OF THE PREFERRED EMBODIMENT

Referring now to the drawing, there is shown a flash unit 11 enclosed in dotted lines which includes a flash device or xenon discharge tube 12 with principal electrodes 13 and 14 included therein. Principal electrode 13 is connected to an upper conductor 15 and principal electrode 14 is connected to a lower conductor 16. The flash unit 11 receives its energization from any suitable source of potential (not shown) connected to terminals 17 and 18 of conductor 15 and 16 respectively.

As is well known in the art, triggering circuitry for a flash unit includes a step up triggering coil or transformer 19 having a primary coil 20 and a secondary coil 21 to trigger the discharge tube 12 through a trigger electrode 22 when required. The trigger electrode 22 may be either within or outside of the discharge tube 12. Resistor 23 is conducted between upper conductor 15 and capacitor 24. Capacitor 24 is connected at its other end to lower conductor 16. Transformer 19, resistor 23 and capacitor 24 comprise triggering circuitry normally used in flash units.

Primary coil 20 of transformer 19 receives its excitation when a normally open switch 25, which is responsive to a shutter switch of an associated camera, is closed. This allows capacitor 24 to discharge across primary winding 20 thereby activating transformer 19 and trigger electrode 22 which triggers discharge tube 12.

Connected across discharge tube 12 is a signal storage means or storage capacitor 26 which will receive its energization from the source (not shown) applied at terminals 17 and 18. Capacitor 26, when fully charged, will not "fire" discharge tube 12, but will apply a voltage to the discharge tube 12 equal to its charged value. The voltage from the charged capacitor 26 and the triggering of the discharge tube 12 through trigger electrode 22, when switch 25 is closed, causes the discharge tube 12 to fire.

In order to provide in this embodiment the addition of a visual alert signal, resistor 27 and a visual alert signal means, such as a gas tube or a neon bulb 28, are serially connected in upper conductor 15 between one end of capacitor 26 and circuitry 29, to be described later. The gas in neon bulb 28 prevents current from travelling to an audible signal means, such as a buzzer, or circuitry 29 until an ignition voltage level or firing voltage is achieved across neon bulb 28. Once this firing voltage is achieved, the gas in neon bulb 28 ionizes or ignites and illuminates thereby providing a visual indication.

The firing voltage of neon bulb 28 is reached when storage capacitor 26 reaches a voltage level capable of firing discharge tube 12 when triggered by the voltage applied to trigger electrode 22. Resistor 27 determines the firing voltage of neon bulb 28.

In order to provide an audible alert signal when storage capacitor 26 is capable of providing its required voltage to discharge tube 12, audible signal means or circuitry 29 is provided. The conducting neon bulb 28 establishes a voltage at a point A between the neon bulb 28 in flash unit 11 and capacitor 30. In circuitry 29, capacitor 30 is connected between upper conductor 15a and lower conductor 16 to allow a slow rise in the voltage established at a point A as capacitor 30 charges.

Neon bulb 28 is further connected to circuitry 29 through resistor 31 to the base of transistor 32. Transistor 32 is connected in a manner well known in the art to a ceramic transducer element 33 to form an audio oscillator. For illustration, transistor 32 is shown to be an NPN transistor, and an audio oscillator utilizing a PNP transistor configuration with a ceramic transducer element will be apparent to those skilled in the art. Transistor 32 and the ceramic transducer element 33 will oscillate in the audible range, and in this preferred embodiment at a value approximating 2 kHz.

As is well known in the art, the unique configuration and resonance characteristics of the ceramic transducer element 33 to allow adequate phase relationships to transistor 32 will cause audio oscillation when properly biased. Transistor 32 receives its bias voltage from a bias source (not shown) applied between terminals 34 and 35 of upper conductor 15b and lower conductor 16 respectively. This bias source is applied to the emitter of transistor 32 from terminal 35 through resistor 36 and ceramic transducer element 33. This bias source is also applied to the collector of transistor 32 through a variable resistor 37 which is varied to adjust the time duration of the audible signal.

Resistor 38 is connected between variable resistor 37 and terminal 34, and capacitor 39 is connected at one end between variable resistor 37 and resistor 38 is connected at the other end to terminal 35 to provide isolation for circuitry 29 in a manner well known in the art.

In operation, switch 25 in flash unit 11 is normally open, and the only voltage applied to discharge tube 12 is that associated with storage capacitor 26. Storage capacitor 26 is normally not great enough to fire tube 12 and requires switch 25 to be closed (as the shutter of the camera is closed) to allow the voltage from the triggering circuitry applied through electrode 22 to "fire" discharge tube 12. Once the discharge tube 12 is fired, the voltage across storage capacitor 26 drops drastically due to the low resistance or "short circuiting" effect of the discharge tube 12. The storage capacitor 26 generally is recharged after the discharge tube 12 has fired in order to provide sufficient voltage to "fire" the discharge tube 12 again.

The gas in neon bulb 28 will ignite and illuminate when the voltage across storage capacitor 26 reaches the ignition voltage level of the neon bulb 28 as determined by series resistor 27.

Once the neon bulb 28 has ignited, and therefore will be conductive, capacitor 30 of circuitry 29 will receive the voltage established by neon bulb 28 and will establish a voltage rise slowly at pont A due to the charging effect of capacitor 30. Thus, the neon bulb 28 or other suitable gas tube (with or without a visual display), may be used to establish a source of voltage when the ionization of the tube occurs. This voltage may be used to activate an audible alert signal.

The increasing voltage appearing at point A is applied to the base of transistor 32 to allow transistor 32 to be biased "on" and thus oscillate and produce an audible alert signal in combination with the ceramic transducer element 33 to alert a camera operator that flash unit 11 is ready for refiring. Transistor 32 is biased in such a manner that oscillations will only occur within a narrow range of the forward voltage applied to the base of transistor 32. Voltages above or below this range will cause oscillations to cease. Since the voltage at point A has a rising characteristic due to the charging effect of capacitor 30, the oscillations caused by transistor 32 and the ceramic transducer element 33 are only momentary. The length of time of these oscillations which will produce the audio signal can be varied by adjusting resistor 37 connected to the collector of transistor 32.

It has been shown that by providing a circuit in the form of an audio oscillator comprising a transistor and a ceramic transducer element that an audible alert signal of a pre-determined duration can be accomplished to indicate the "ready" state of a flash unit.

While an embodiment and application of this invention has been shown and described, it will be apparent to those skilled in the art that many more modifications are possible without departing from the inventive concepts herein described. The invention, therefore, is not to be restricted except as is necessary by the prior art and by the spirit of the appended claims.

What is claimed as new and desired to be secured by Letters Patent of the United States is:

1. An electronic flash unit comprising:
   a flash device;
   storage means for applying a voltage to said flash device;
   circuit means for triggering said flash device and for allowing said storage means to apply the voltage to said flash device;
   means for producing an audible alert signal of a predetermined duration when said storage means is at a voltage level sufficient for applying the voltage to said flash device; and
   signal means electrically coupled to said audible alert signal means for providing a signal to said audible alert signal means, said audible alert signal means being activated during a predetermined portion of the signal produced by said signal means.

2. An electronic flash unit as in claim 1 wherein the audio alert signal is produced at a frequency of approximately 2 kilohertz.

3. An electronic flash unit as in claim 2 wherein said means for producing an audible alert signal is an audio oscillator.

4. An electronic flash unit as in claim 3 wherein said audio oscillator is a single transistor ceramic transducer element audio oscillator.

5. An electronic flash unit as in claim 1 wherein said signal means provides a varying signal and said audible alert signal means is activated only during a predetermined portion of the varying signal.

6. An electronic flash unit as in claim 5 further including a switching means electrically coupled to said signal means and to said means for producing an audible alert signal, the predetermined portion of the varying signal of said signal means activating said switching means which in turn activates said means for producing an audible alert signal.

7. An electronic flash unit as in claim 6 wherein said signal means is a capacitor and the varying signal is an increasing signal which activates said switching means at the beginning of the predetermined portion of the varying signal and deactivates said switching means at the end of the predetermined portion of said varying signal thereby realizing an audible alert signal of a predetermined duration.

8. An electronic flash unit comprising:
a flash device;
storage means for applying a voltage to said flash device;
circuit means for triggering said flash device and for allowing discharge of said storage means into said flash device;
means for producing an audible alert signal when said storage means is at a voltage level sufficient for applying the voltage to said flash device;
means for terminating the audible signal after a predetermined duration; and
signal means electrically coupled to said audible alert signal means for providing a varying signal to said audible alert signal means, said audible alert signal being activated a predetermined time delay after the varying signal is provided.

9. An electronic flash unit as in claim 8 wherein said means for terminating the audible signal after the predetermined duration includes capacitive means for applying a voltage to said audio alert signal means thereby terminating the audio alert signal.

10. An electronic flash unit as in claim 8 wherein said means for producing an audible signal is an audio oscillator and said audio oscillator is a single transistor ceramic transducer element audio oscillator.

11. An electronic flash unit as in claim 8 further including a switching means electrically coupled to said audible alert signal means and to said signal means, said switching means having a conductive and a nonconductive state, said switching means being in its conductive state only when a predetermined portion of the varying signal is applied thereto, thereby providing the audible alert signal.

12. An electronic flash unit comprising:
a flash device;
storage means for applying a first voltage to said flash device;
circuit means for applying a triggering voltage to said flash device;
means for producing a visual signal when said storage means is at a voltage level sufficient to apply the first voltage to said flash device;
means for producing an audible signal of a predetermined duration when said storage means is at a voltage level sufficient to apply the first voltage to said flash device; and
signal means electrically coupled to said visual signal means and said audible signal means for providing a varying signal to said audible signal means in response to the visual signal produced by said visual signal means, a predetermined portion of the varying signal being capable of activating said audible signal means.

13. An electronic flash unit including a flash device comprising:
storage means for applying a first voltage to the flash device;
circuit means for applying a triggering voltage to the flash device;
means for producing a visual signal when said storage means is at a voltage level sufficient to apply the first voltage to the flash device;
means for producing an audible signal in response to the production of the visual signal;
means for terminating the audible signal after a predetermined time; and
signal means electrically coupled to said visual signal means and said audible signal means for providing a varying signal to said audible signal means, said varying signal being initiated when said visual signal means produces the visual signal, the varying signal providing, at a predetermined portion thereof, the activation of said audible signal means.

14. An electronic flash unit as in claim 13 wherein said means for producing a visual signal is a neon bulb.

15. An electronic flash unit comprising:
a flash device;
source means for applying a voltage to said flash device;
circuit means for triggering said flash device and for allowing said source means to apply the voltage to said flash device;
a gas tube responsive to said source means and capable of achieving an ionization state when said source means is at a voltage level sufficient for applying the voltage to said flash device;
audible alert signal means responsive to said gas tube for producing an audible alert signal of a predetermined duration when said gas tube achieves the ionization state; and
signal means electrically coupled to said gas tube and to said audible alert signal means for providing a varying signal to said audible alert signal means, a predetermined portion of the varying signal being capable of activating said audible alert signal means.

16. An electronic flash unit as in claim 15 including means for terminating the audible alert signal after a pre-determined duration.

17. An electronic flash unit as in claim 15 wherein said gas tube is a neon bulb.

18. An electronic flash unit as in claim 15 wherein said means for producing the audible alert signal is an audio oscillator.

* * * * *